(12) United States Patent
Ma (10) Patent No.: US 11,784,451 B2
(45) Date of Patent: Oct. 10, 2023

(54) CLAMPING JAW OF CONNECTING TERMINAL

(71) Applicant: Weidmüller Interface GmbH & Co. KG, Detmold (DE)

(72) Inventor: Yunchang Ma, Beijing (CN)

(73) Assignee: WEIDMÜLLER INTERFACE GMBH & CO. KG

( * ) Notice: Subject to any disclaimer, the term of this patent is extended or adjusted under 35 U.S.C. 154(b) by 71 days.

(21) Appl. No.: 17/624,140

(22) PCT Filed: Jun. 24, 2020

(86) PCT No.: PCT/CN2020/098095
§ 371 (c)(1),
(2) Date: Dec. 30, 2021

(87) PCT Pub. No.: WO2021/004290
PCT Pub. Date: Jan. 14, 2021

(65) Prior Publication Data
US 2022/0329030 A1     Oct. 13, 2022

(30) Foreign Application Priority Data

Jul. 5, 2019   (CN) .......................... 201910438453.3
Jul. 5, 2019   (CN) .......................... 201910604446.8

(51) Int. Cl.
*B23P 19/00*     (2006.01)
*H01R 43/058*    (2006.01)

(52) U.S. Cl.
CPC .................................. *H01R 43/058* (2013.01)

(58) Field of Classification Search
CPC .. B25J 19/0091; B25J 19/021; B25J 17/0208; B25J 15/0293; H01R 43/058
See application file for complete search history.

(56) References Cited

U.S. PATENT DOCUMENTS

| 4,398,136 A * | 8/1983 | Tanaka ................. B23Q 17/002 408/8 |
| 9,785,193 B2 * | 10/2017 | Sano ..................... G06F 1/1654 |
| 10,707,590 B2 * | 7/2020 | Crotti ....................... H01R 4/40 |

FOREIGN PATENT DOCUMENTS

| CN | 201214194 Y | 4/2009 |
| CN | 103786152 A | 5/2014 |
| CN | 204221501 U | 3/2015 |
| CN | 208358800 U | 1/2019 |

(Continued)

*Primary Examiner* — Paul D Kim
(74) *Attorney, Agent, or Firm* — LAUBSCHER & LAUBSCHER, P.C.

(57) ABSTRACT

A clamping jaw of a connecting terminal includes a rotary cylinder assembly configured for achieving different swing angles for clamping different types of connecting terminals. The rotary cylinder assembly includes a rotating shaft for providing a driving force through rotating cylinder and an initial state limit part. A first state limit part is configured to position the rotating cylinder in a first rotation angle and a second state limit part has a working and non-working position. When the second state limit part is in the working position, it is configured to position the rotating cylinder in a second rotation angle. When the second state limit part is in the non-working position, it is configured to position the rotating cylinder in the first rotation angle. The second rotation angle is smaller than the first rotation angle.

11 Claims, 5 Drawing Sheets

(56) References Cited

FOREIGN PATENT DOCUMENTS

| | | | |
|---|---|---|---|
| CN | 110202339 | A | 9/2019 |
| CN | 210099405 | U | 2/2020 |
| JP | 2004283944 | A | 10/2004 |

* cited by examiner

CLAMPING JAW OF CONNECTING TERMINAL

This application is a § 371 National Stage Entry of PCT/CN2020/098095 filed Jun. 24, 2020. PCT/CN2020/098095 claims priority of CN 2019 10604446.8 filed Jul. 5, 2019 and CN 2019 21043845.3 filed Jul. 5, 2019. The entire content of these applications is incorporated herein by reference.

TECHNICAL FIELD

The disclosure relates to the field of power distribution, and more particularly to a clamping jaw of a connecting terminal.

BACKGROUND OF THE INVENTION

With the rapid development of the power distribution industry, automatically installing a connecting terminal on a guide rail has became an inevitable trend. However, due to different types and models of the connecting terminal, when the connecting terminal is automatically installed on the guide rail, a technical problem that will be confronted is how to obtain clamping of different types and models of connecting terminals, and even clamping of special types of connecting terminals by one clamping device.

SUMMARY OF THE INVENTION

A primary object of the present disclosure is to provide a clamping jaw of a connecting terminal which can solve the problem of clamping of different types and models of connecting terminals and clamping of special types of connecting terminals by one clamping device.

In order to achieve the above object and other advantages, the present disclosure provides a clamping jaw of a connecting terminal including a rotary cylinder component which is configured for achieving different swing angles for clamping different types of connecting terminals and a pneumatic damper component which is connected with the rotary cylinder component and makes open and close movements. A terminal clamping arm component is connected with the pneumatic damper component, moves with the pneumatic damper component, and is configured for clamping a connecting terminal. The rotary cylinder component includes a fixing plate component having a bearing mounting plate and a rotating shaft mounted on the bearing mounting plate to provide a driving force through a rotating cylinder. An initial state limiting part is installed on the bearing mounting plate and configured to position the rotating cylinder in an initial state of rotation. A first state limit part is installed on the bearing mounting plate and configured to position the rotating cylinder in a first rotation angle which is rotated clockwise by a predetermined angle relative to the initial state. A second state limit part is movably installed on the bearing mounting plate and has a working position and a non-working position relative to the bearing mounting plate. When the second state limit part is in the working position, it is configured to position the rotating cylinder in a second rotation angle, and when the second state limit part is in the non-working position, it is configured to position the rotating cylinder in the first rotation angle, wherein the second rotation angle is smaller than the first rotation angle.

Preferably, the first rotation angle is 83-85 degrees, and the second rotation angle is 15 degrees.

In a preferred embodiment, the initial state limit part is a first limit block which is provided with a semi-cylindrical clamping groove through which a clamping component with a protrusion can be clamped. The first state limit part is a buffer block which is provided with a cylinder or a quasi-cylinder, and the second state limit part is a first positioning pin shaft which is a cylinder or a quasi-cylinder that is stretchable relative to the bearing mounting plate. The first positioning pin shaft achieves and accordian-like movement through a needle-shaped cylinder mounted on the bearing mounting plate through a needle-shaped cylinder mounting seat.

The pneumatic damper component includes a pneumatic damper mounting plate which is connected with the rotary cylinder component, makes open and close movements, and moves with the rotating cylinder component. A pneumatic damper is mounted on the pneumatic damper mounting plate and drives the terminal clamping arm component to move. A second limit block is mounted on the pneumatic damper mounting plate and cooperates with the first state limit part and the second state limit part to position the rotating cylinder in the first rotation angle and the rotating cylinder in the second rotation angle, respectively. A second positioning pin shaft is mounted on the pneumatic damper mounting plate and cooperates with the initial state limit part to position the rotating cylinder in the initial state of rotation.

Preferably, the terminal clamping arm component includes a terminal clamping arm is fixedly connected with the pneumatic damper and a POM block, which is installed at a lower part of the terminal clamping arm and protrudes to a side where the connecting terminal is clamped.

A mounting column is arranged at the lower part of the terminal clamping arm and a mounting hole is arranged at the POM block. The mounting hole is sleeved on the mounting column and the POM block can slide relative to the mounting column in a sliding direction parallel to a movement direction of the pneumatic damper. A rubber block is arranged between the mounting hole and the mounting column and at the side where the connecting terminal is clamped and is configured for filling a gap between the POM block and the terminal clamping arm. At the gap between the POM block and the terminal clamping arm, the compressed rubber block has an inconsistent length when the connecting terminal is clamped so that the POM block wraps the connecting terminal to provide conformal clamping without falling off.

According to a preferred embodiment, the POM block is a plurality of independent sub-blocks that are stacked. When clamping, the multi-layer POM block moves back and forward with the terminal clamping arm, and the terminal clamping arm plays a guiding role for conformal clamping and preventing the connecting terminal from falling off.

The clamping jaw of a connecting terminal further includes a clamping head component which is used for connecting the rotary cylinder component to a mechanical hand. The clamping head component includes a vertical plate which is fixed on the rotary cylinder component and a guiding seat which is fixed on the mechanical hand and arranged in parallel with the vertical plate. An optical shaft is fixed on the vertical plate, sleeved with a spring, and slidably penetrated on the guiding seat. A fixing block is fixed on the optical shaft, the fixing block and the vertical plate being located on both sides of the guiding seat, respectively. A light blocking plate is installed between the vertical plate and the fixing block and is provided with a notch. A photoelectric switch is installed on the guiding seat and can be triggered by the notch on the light blocking plate when the vertical plate compresses the spring in place.

The clamping jaw of a connecting terminal according to the invention solves the problem of clamping of different types and models of connecting terminals and clamping special types of connecting terminals by one clamping device. The device can also easily clamp large-size and complex-shaped connecting terminals that are not easily clamped.

The clamping jaw can be connected to a PLC control system to provide automatic clamping of the connecting terminal.

The clamping jaw also has a compact mechanical structure and flexible operation and is suitable for large-scale promotion and use.

BRIEF DESCRIPTION OF THE DRAWINGS

Other objects and advantages of the invention will become apparent from a study of the following description when viewed in the light of the accompanying drawing, in which.

DETAILED DESCRIPTION

Figure 1:
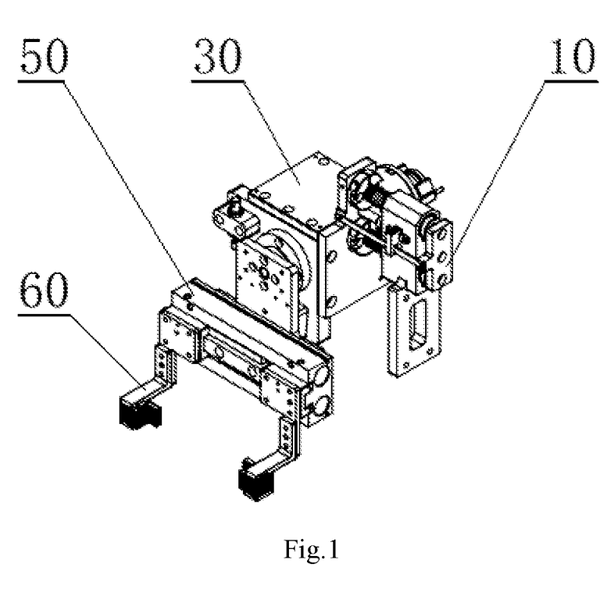
FIG. 1 is a perspective view of the clamping jaw for a connecting terminal according to the invention.

As shown in FIG. 1, the disclosure relates a clamping jaw of a connecting terminal including a rotary cylinder assembly 30 which is configured to achieve different swing angles for clamping different types of connecting terminals. A pneumatic damper assembly 50 is connected with the rotary cylinder assembly 30 and makes open and close movements. A terminal clamping arm assembly 60 is connected with the pneumatic damper assembly 50, moves with the pneumatic damper assembly 50, and is configured for clamping a connecting terminal.

Figure 2:
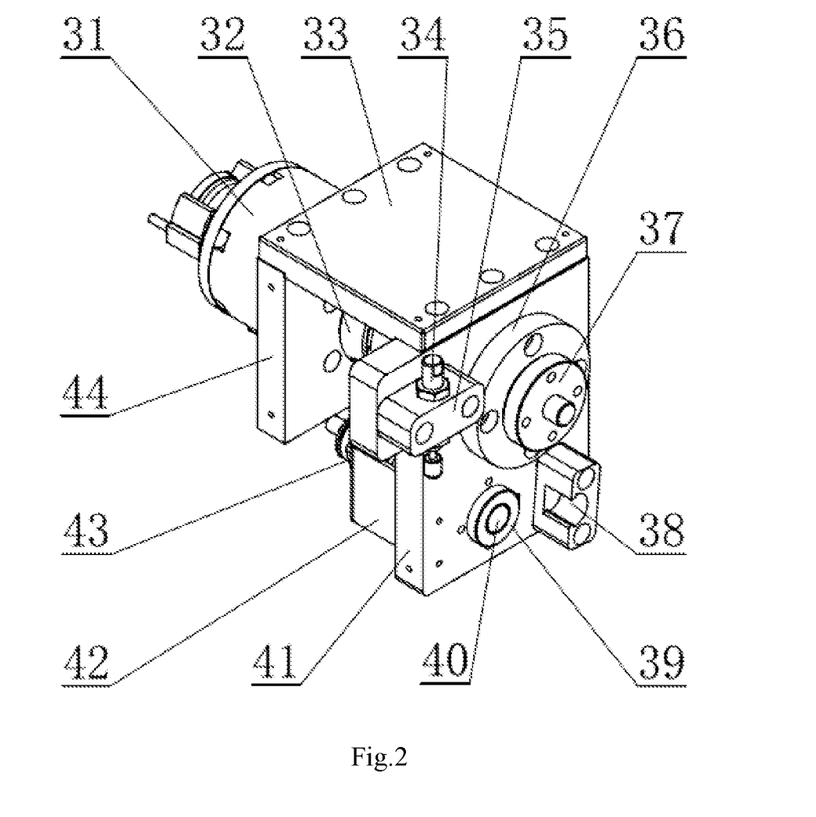
FIG. 2 is a perspective view of the rotary cylinder component according to the invention.

As shown in FIG. 1 and FIG. 2, the rotary cylinder component 30 includes a fixing plate component including a bearing mounting plate 41, a rotating cylinder fixing plate 44 and a rotating cylinder top plate 33. The rotating cylinder top plate 33 is arranged horizontally, and the rotating cylinder fixing plate 44 and the bearing mounting plate 41 are respectively arranged on opposite sides of the rotating cylinder top plate 33 and are perpendicular to the rotating cylinder top plate 33 for forming a gate shape to place components. A rotating shaft 37 is mounted on the bearing mounting plate 41 through a rotating shaft bearing seat 36 and provides a driving force through a rotating cylinder 31. The rotating shaft 37 and the rotating cylinder 31 are connected by a coupling 32 to transmit a driving force, and the coupling 32 is arranged under the rotating cylinder top plate 33 so that the components are compact. An initial state limit part, which is installed on the bearing mounting plate 41, is configured to position the rotating cylinder 31 in an initial state of rotation. The initial state limit part may be a buffer component, a toggle block, a block with a clamping groove, or a manual toggle component. A first state limit part is installed on the bearing mounting plate 41 and configured to position the rotating cylinder 31 in a first rotation angle, the first rotation angle being rotated clockwise by a predetermined angle relative to the initial state. The first state limit part may be a buffer component, a toggle block, a block with a clamping groove, or a manual toggle component. A second state limit part is movably installed on the bearing mounting plate 41 and has a working position and a non-working position relative to the bearing mounting plate 41. When the second state limit part is in the working position, it is configured to position the rotating cylinder 31 in a second rotation angle, and when the second state limit part is in the non-working position, it is configured to position the rotating cylinder 31 in the first rotation angle. The second rotation angle is smaller than the first rotation angle. The second state limit part may be a manual telescopic column or an automatic telescopic shaft, and the automatic telescopic shaft can achieve its telescopic function through an air cylinder, a screw rod or an elastic component.

The rotating cylinder 31 rotates at different angles to clamp different types of connecting terminals, and a specific process is as follows.

S1, initialization: the initial state limit part positions the rotating cylinder 31 to an initial state and the pneumatic damper component starts to work.

S2, clamping the connecting terminal: a mechanical hand moves a clamping jaw of a connecting terminal along the Y-axis or along the X-axis (if necessary) to the vicinity of a elastic clamp, moving the clamping jaw of the connecting terminal downward along the Z axis, the pneumatic damper assembly driving the terminal clamping arm assembly to clamp the connecting terminal, moving the clamping jaw of the connecting terminal upward along the Z axis and clamping the connecting terminal to be clamped.

S3, transport and rotation of the connecting terminal: moving the clamping jaw of the connecting terminal along the Y axis or along the X axis (if necessary) to the vicinity of a guiding rail and simultaneously rotating the rotating cylinder 31 until the connecting terminal is positioned.

The rotation of the rotating cylinder 31 until the connecting terminal is positioned is completed by the following process.

S31. A control mechanism recognizes the type of connecting terminals to be installed and clamps two types of connecting terminals to be installed at one time. A rotation angle is the first rotation angle when a first type of connecting terminal is installed, and a rotation angle is the second rotation angle when a second type of connecting terminal is installed.

S32. The control mechanism selecting limit parts according to the types of connecting terminals to be installed. The first state limit part starts to work and the rotating cylinder 31 is positioned at the first rotation angle if the connecting terminal to be installed is the first type. The second state limit part starts to work and the rotating cylinder 31 is positioned at the second rotation angle if the connecting terminal to be installed is the second type.

S4, clamping the connecting terminal: disconnecting an air supply for the rotating cylinder 31, moving the clamping jaw of the connecting terminal downward along the Z axis, contacting the connecting terminal to be installed with the guiding rail, separating the pneumatic damper assembly from the first state limit part or the second state limit part under the drive of the reaction force of the guiding rail, resetting and rotating the connecting terminal, and clamping the connecting terminal with the guiding rail.

In an actual production, there are various types of connecting terminals, and various types of connecting terminals are clamped by different devices or multiple mechanical hands according to the prior art. One clamping jaw of a connecting terminal of the present invention can clamp various types of connecting terminals without requiring multiple mechanical hands to operate and has more flexible operation.

The first rotation angle is 83-85 degrees, and the second rotation angle is 15 degrees. The set angles are inclination angles required when clamping the two most common types of connecting terminals.

As shown in FIG. 2, the initial state limit part is a first limit block 38 which is provided with a semi-cylindrical clamping groove. A clamping component with a protrusion can be clamped through the clamping groove for positioning automation.

The first state limit part is a buffer block 34 buffer block 34 mounted on the bearing mounting plate 41 through a buffer block mounting plate 35 and is provided with a cylinder or a like device. The buffer block 34 cooperates with a component with a clamping groove structure for automatic positioning The second state limit part is a first positioning pin shaft 40 which is a cylinder or the like that is extendable relative to the bearing mounting plate 41. The first positioning pin shaft 40 is installed on the bearing mounting plate 41 through a positioning pin shaft seat 39 and is located between the buffer block 34 and the first limit block 38. When the first positioning pin shaft 40 is extended, the rotation angle of the rotating cylinder 31 is positioned at 15 degrees, and when the first positioning pin shaft 40 draws back, the rotating cylinder 31 can be rotated to 83-85 degrees.

The first positioning pin shaft 40 achieves its accordian-like or reciprocal movement through a needle-shaped cylinder 43, and the needle-shaped cylinder 43 is mounted on the bearing mounting plate 41 through a needle-shaped cylinder mounting seat 42. The needle-shaped cylinder 43 provides automatic operation of the second state limit part, and improves the operation efficiency.

Figure 3:
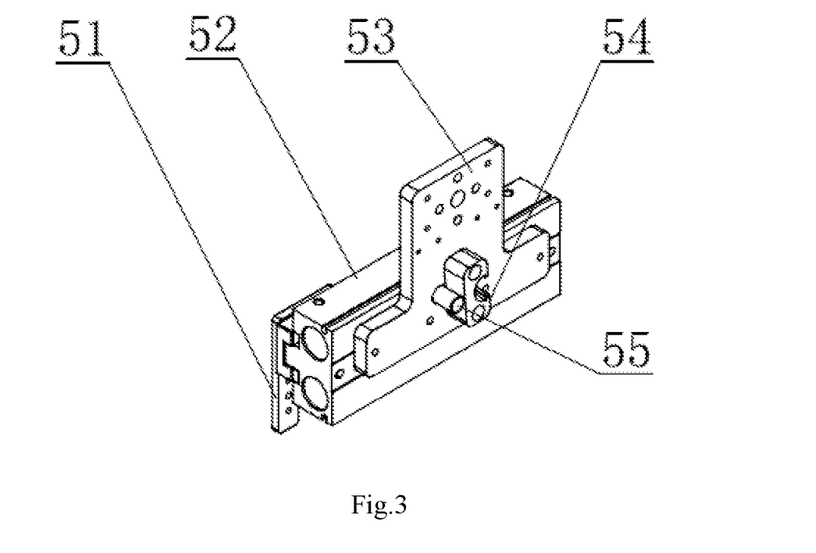
FIG. 3 is a perspective view of the pneumatic damper component according to the invention.

As shown in FIG. 1 and FIG. 3, the pneumatic damper assembly 50 is connected with the rotary cylinder assembly 30 to move the terminal clamping arm assembly 60. The pneumatic damper assembly 50 Includes a pneumatic damper mounting plate 53 which is connected with the rotary cylinder assembly 30. The pneumatic damper mounting plate 53 being provided with a mounting hole which is connected to a rotating shaft 37 in the rotary cylinder component 30. A pneumatic damper 52 is mounted on the pneumatic damper mounting plate 53 and drives the terminal clamping arm assembly 60. The terminal clamping arm assembly 60 is connected with the pneumatic damper 52 through a terminal clamping arm component mounting plate 51. A second limit block 54 is mounted on the pneumatic damper mounting plate 53 and cooperates with the first state limit part to position the rotating cylinder 31 in the first rotation angle. Specifically, a clamping groove is arranged at the second limit block 54 mounted on the pneumatic damper component 50, the clamping groove being provided with a silicone-containing pad for buffering. When the first positioning pin shaft 40 extends out, the rotation angle of the rotating cylinder 31 is positioned at 15 degrees and the first positioning pin shaft 40 is clamped with the second limit block 54 mounted on the pneumatic damper assembly 50. When the first positioning pin shaft 40 draws back the buffer block 34 being clamped with the second limit block 54 mounted on the pneumatic damper assembly 50, the rotating cylinder 31 is allowed to be rotated to 83-85 degrees. A second positioning pin shaft 55 is mounted on the pneumatic damper mounting plate 53 and cooperates with the initial state limit part to position the rotating cylinder 31 in the initial state of rotation. Specifically, in the initial state of rotation, the first limit block 38 on the rotary cylinder assembly 30 is clamped with the second positioning pin shaft 55 on the pneumatic damper assembly 50.

In the above embodiment, components on the pneumatic damper assembly 50 are clamped with the first state limit part and the second state limit part to position the rotating cylinder 32 at different rotation angles so that the entire device has higher stability and flexibility.

Figure 6:
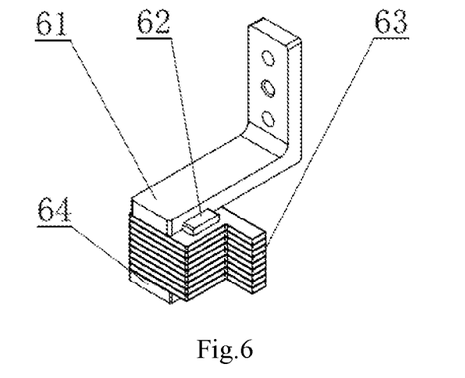
FIG. 6 is a perspective view of the terminal clamping arm component according to the invention.

As shown in FIG. 6, the terminal clamping arm assembly 60 includes a terminal clamping arm 61 fixedly connected with the pneumatic damper 52 and a POM (polyformaldehyde) block 63 installed at a lower part of the terminal clamping arm 61 and protruding to a side where the connecting terminal is clamped.

In a clamping process, the POM block 63 is installed between the terminal clamping arm 61 and a square pressing plate 64, the POM block 63 moves back and forward with the terminal clamping arm 61, and the terminal clamping arm 61 plays a guiding role to provide conformal clamping and prevent the connecting terminal from falling off. In the prior art, clamping jaws are generally metal clamping jaws or plastic flexible clamping jaws. The metal clamping jaws have high rigidity and low elastic deformability which can easily cause damage to the surface of a clamped object, and the flexible clamping jaws, which are mainly made of plastic material, have high elasticity and low rigidity which cannot satisfy the requirement of clamping of the connecting terminal. The clamping jaw made of POM block 63 has high rigidity, good elasticity and antifriction and wear resistance to minimize damage to the surface of the clamped object.

Figure 7:
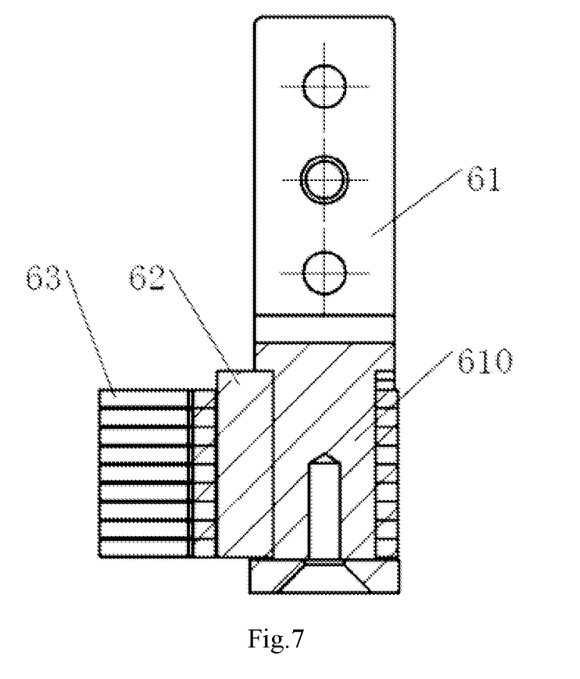
FIG. 7 is a front view of the terminal clamping arm component according to the invention.

As shown in FIG. 6 and FIG. 7, a mounting column 610 is arranged at a lower part of the terminal clamping arm 61, and a mounting hole is arranged at the POM block 63. The mounting hole is sleeved on the mounting column 610, the POM block 63 can slide relative to the mounting column 610, and a sliding direction is parallel to a movement direction of the pneumatic damper 52. A rubber block 62 is arranged between the mounting hole and the mounting column 610 and at the side where the connecting terminal is clamped. Specifically, the mounting column 610 is a square column, and the mounting hole is a square hole. The mounting hole is sleeved on the mounting column 610, and the width of the mounting hole is larger than the width of the mounting column 610, so that the POM block 63 can slide relative to the mounting column 610, and the sliding direction is parallel to a movement direction of the pneumatic damper 52. The rubber block 62 is arranged between the mounting hole and the mounting column 610 and at the side where the connecting terminal is clamped. In a clamping process, the amount of arcuate compression on the connecting terminal surface to the rubber block 62 is different which results in different sliding distances of the POM block on the mounting column 610 to fit the POM block and the arc shape on the connecting terminal surface and then to achieve conformal clamping and prevent the connecting terminal from falling off. Therefore, the terminal clamping arm assembly 60 has wider application range.

The POM block 63 is a plurality of independent sub-blocks that are stacked. Preferably, the POM block 63 includes 3-12 independent sub-blocks that are stacked. In the clamping process, the multi-layer POM block 63 moves backward and forward with the terminal clamping arm 61, and the terminal clamping arm 61 plays a guiding role to achieve conformal clamping and prevent the connecting terminal from falling off. Providing multiple independent sub-blocks allows conformal clamping from the point to the surface to prevent the connecting terminal from falling off.

Figure 4:
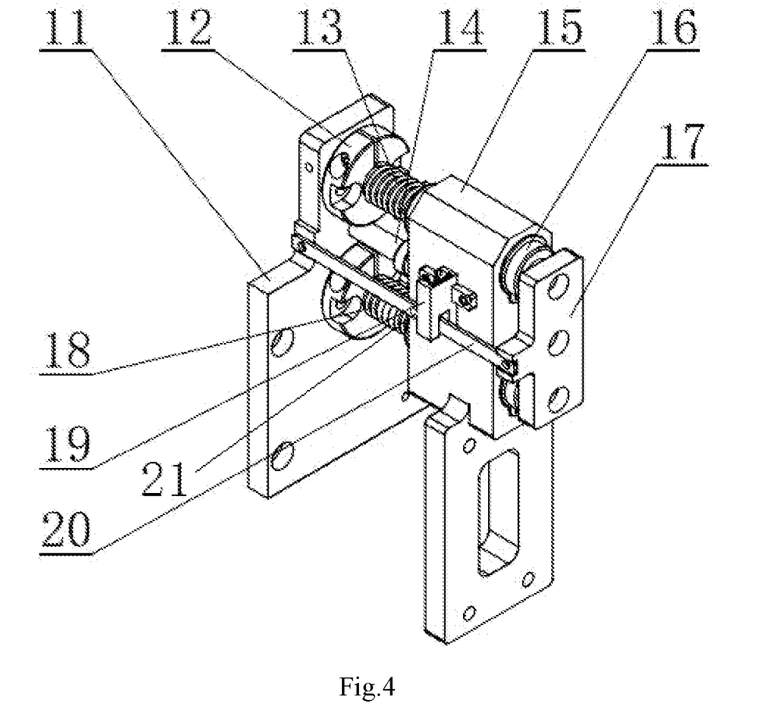
FIG. 4 is a perspective view of the clamping head component according to the invention.
Figure 5:
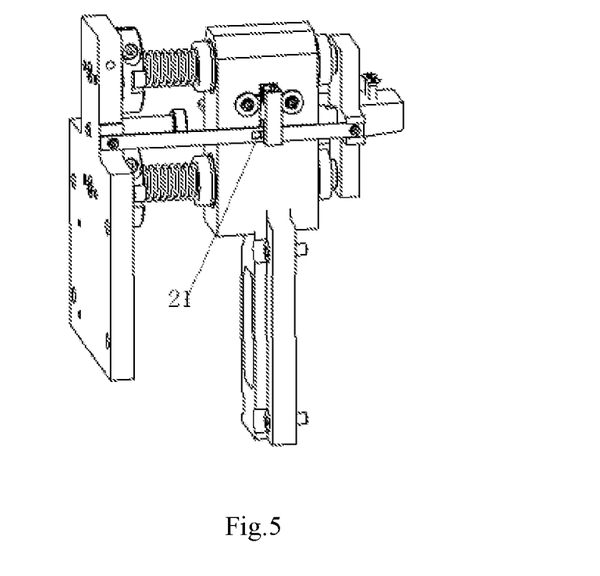
FIG. 5 is a perspective view of the clamping head component according to the invention.

As shown in FIG. 1, FIG. 4 and FIG. 5, the clamping jaw of a connecting terminal further includes a clamping head assembly 10 which is used for connecting the rotary cylinder component 30 to a mechanical hand. The clamping head assembly 10 Includes a vertical plate 11 which is fixed on the rotary cylinder component 30. The vertical plate 11 is connected to the bearing mounting plate 41 and the rotating cylinder fixing plate 44 by screws. The vertical plate 11 may also be provided with a limit column 14 that limits its movement. A guiding seat 15 is fixed on the mechanical hand and arranged in parallel with the vertical plate 11. A three-axis mechanical hand is shown in FIG. 6 which can provides an X, Y, Z three-axis linkage. An optical shaft 18 is fixed on the vertical plate 11 through an optical shaft fixing seat 12 and sleeved with a spring 13. The optical shaft is slidably penetrated on the guiding seat 15. The optical shaft 18 is further provided with a linear bearing 16 and more preferably, two sets of optical shafts 18 are provided. A fixing block 17 is fixed on the optical shaft 18, the fixing block 17 and the vertical plate 11 being located on both sides of the guiding seat 15, respectively. A light blocking plate 20 is installed between the vertical plate 11 and the fixing block 17, and is provided with a notch 21. A photoelectric switch 19 is installed on the guiding seat 15 and can be triggered by the notch 21 on the light blocking plate 20 when the vertical plate 11 compresses the spring 13 in place to feed back information of whether the connecting terminal is clamped.

Figure 8:
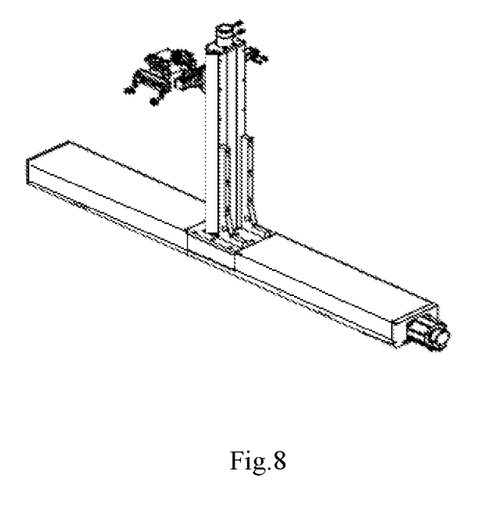
FIG. 8 is a perspective view of the mechanical hand according to the invention.

As shown in FIG. 8, a clamping process of the mechanical hand is as follows:

S1, initialization: the second positioning pin shaft 55 is clamped to the first limit block 38. At this time, the angle of the rotating cylinder 31 is 0 degrees, and the pneumatic damper 52 is opened.

S2, clamping the connecting terminal: a clamping jaw of a connecting terminal moves along the Y-axis or along the X-axis (if necessary) to the vicinity of the elastic clamp, the clamping jaw of the connecting terminal moves downward along the Z axis, the pneumatic damper 52 drives the POM block to clamp the connecting terminal to be clamped, and the clamping jaw of the connecting terminal moves upward along the Z axis to clamp the connecting terminal to be clamped.

S3, transport and rotation of the connecting terminal: the clamping jaw of the connecting terminal moves along the Y axis or along the X-axis (if necessary) to the vicinity of the guiding rail, and the rotating cylinder 31 is simultaneously rotated until the connecting terminal is positioned.

The rotation of the rotating cylinder 31 until the connecting terminal is positioned is completed by the following process:

S31, the control mechanism recognizes the type of connecting terminals to be installed. In the embodiment, there are two types of connecting terminals to be installed, a first type is installed at a rotation angle of 15 degrees, and a second type is installed at a rotation angle of 83-85 degrees.

S32, the control mechanism selects limit parts according to the types of connecting terminals to be installed. If the connecting terminal to be installed is the first type, the needle-shaped cylinder 43 is controlled to stretch out and to drive the first positioning pin shaft 40 to extend which indicates that the first positioning pin shaft 40 is selected for positioning. If the connecting terminal to be installed is the second type, the needle-shaped cylinder 43 is controlled to draw back and to drive the first positioning pin shaft 40 to draw back, which indicates that the buffer block 34 is selected for positioning.

S33, the rotating cylinder 31 is rotated until the second limit block 54 is clamped to the first positioning pin shaft 40 or the buffer block 34 so that the connecting terminal to be installed can be rotated at an angle of 15 degrees or 83-85 degrees.

S4, clamping the connecting terminal: air supply for the rotating cylinder 31 is disconnected, and the clamping jaw of the connecting terminal moves downward along the Z axis. When the connecting terminal to be installed is in contact with the guiding rail, the second limit block 54 is separated from the first positioning pin shaft 40 or the buffer block 34 under the drive of the reaction force of the guiding rail, the connecting terminal is subjected to reset rotation, and the connecting terminal is clamped with the guiding rail. At this time, the second positioning pin shaft 55 is clamped to the first limit block 38.

S5, confirming of clamping in place: the rotation during the clamping process of the connecting terminal brings a thrust and displacement in the Y-axis direction. The vertical plate 11 moves relative to the guiding seat 15, and the notch 21 on the light blocking plate 20 triggers the photoelectric switch 19 to confirm that clamping is in place. If the photoelectric switch 19 is triggered, the pneumatic damper 52 is opened, and the clamping jaw of the connecting terminal moves upward along the Z axis, then return to the step S2 to continue clamping. In the step S4, if the connecting terminal is not in contact with the guiding rail or the connecting terminal is not clamped to the guiding rail due to some reasons, this will prevent the photoelectric switch 19 from being triggered. The system will issue an alarm. The clamping jaw of a connecting terminal of the invention can solve the problem of clamping different types and models of connecting terminals and clamping special types of connecting terminals by one clamping device. The device can also easily clamp large-size and complex-shaped connecting terminals that are not easy to be clamped. The clamping jaw of a connecting terminal has compact mechanical structure and flexible operation, and is suitable for large-scale promotion and use.

As described above, the provides at least the following substantial improvements and beneficial effects. The clamping jaw of a connecting terminal permits clamping of different types and models of connecting terminals and clamping of special types of connecting terminals by one clamping device. The device can also easily clamp large-size and complex-shaped connecting terminals that are not easy to be clamped. The clamping jaw of a connecting terminal can be connected to a PLC control system for automatic clamping of the connecting terminal. 3. The clamping jaw of a connecting terminal has compact mechanical structure and flexible operation and is suitable for large-scale promotion and use.

Although the embodiments of the present disclosure have been shown and described, those of ordinary skill in the art can understand that various changes, modifications, replacements and variations can be made to these embodiments without departing from the principle and spirit of the present disclosure.

What is claimed is:

1. A clamping jaw of a connecting terminal, comprising:
    (a) a rotary cylinder assembly configured for providing different swing angles for clamping different types of connecting terminals;
    (b) a pneumatic clamper assembly connected with the rotary cylinder assembly and movable between open and close positions; and
    (c) a terminal clamping arm assembly which is connected with the pneumatic clamper assembly, moves with the pneumatic clamper assembly, and is configured for clamping at least one of the connecting terminals;
    wherein the rotary cylinder assembly comprises:
        (1) a fixing plate assembly including a bearing mounting plate;
        (2) a rotating shaft mounted on the bearing mounting plate and providing a driving force through a rotating cylinder;
        (3) an initial state limit part installed on the bearing mounting plate and configured for positioning the rotating cylinder in an initial state of rotation;
        (4) a first state limit part is installed on the bearing mounting plate and configured for positioning the rotating cylinder in a first rotation angle rotated clockwise by a predetermined angle relative to the initial state of rotation; and
        (5) a second state limit part movably installed on the bearing mounting plate and having a working position and a non-working position relative to the bearing mounting plate, wherein when the second state limit part is in the working position, it is configured for positioning the rotating cylinder in a second rotation angle, and when the second state limit part is in the non-working position, it is configured for positioning the rotating cylinder in the first rotation angle and wherein the second rotation angle is smaller than the first rotation angle.

2. The clamping jaw of a connecting terminal according to claim 1, wherein the first rotation angle is 83-85 degrees, and the second rotation angle is 15 degrees.

3. The clamping jaw of a connecting terminal according to claim 2, wherein the initial state limit part is a first limit block containing a semi-cylindrical clamping groove through which a clamping component with a protrusion can be clamped.

4. The clamping jaw of a connecting terminal according to claim 2, wherein the first state limit part is a buffer block provided with a cylinder.

5. The clamping jaw of a connecting terminal according to claim 2, wherein the second state limit part is a first positioning pin shaft including a cylinder that is extendable relative to the bearing mounting plate.

6. The clamping jaw of a connecting terminal according to claim 5, wherein the first positioning pin shaft is movable through a needle-shaped cylinder mounted on the bearing mounting plate through a needle-shaped cylinder mounting seat.

7. The clamping jaw of a connecting terminal according to claim 1, wherein the pneumatic clamper assembly comprises;
    (a) a pneumatic clamper mounting plate which is connected with the rotary cylinder assembly, makes open and close movements, and moves with the rotary cylinder assembly;
    (b) a pneumatic clamper which is mounted on the pneumatic clamper mounting plate and drives the terminal clamping arm assembly to move;
    (c) a second limit block which is mounted on the pneumatic clamper mounting plate and cooperates with the first state limit part and the second state limit part to position the rotating cylinder in the first rotation angle and to position the rotating cylinder in the second rotation angle, respectively; and
    (d) a second positioning pin shaft which is mounted on the pneumatic clamper mounting plate and cooperates with the initial state limit part to position the rotating cylinder in the initial state of rotation.

8. The clamping jaw of a connecting terminal according to claim 1, wherein the terminal clamping arm assembly comprises:
    (a) a terminal clamping arm which is fixedly connected with the pneumatic clamper assembly; and
    (b) a polyformaldehyde block which is installed at a lower part of the terminal clamping arm and protrudes to a side where the connecting terminal is clamped.

9. The clamping jaw of a connecting terminal according to claim 8, wherein
    a mounting column is arranged at the lower part of the terminal clamping arm and a mounting hole is arranged at the polyformaldehyde block;
    the mounting hole is sleeved on the mounting column and the polyformaldehyde block can slide relative to the mounting column in a sliding direction parallel to a movement direction of the pneumatic clamper; and
    a rubber block is arranged between the mounting hole and the mounting column and at the side where the connecting terminal is clamped.

10. The clamping jaw of a connecting terminal according to claim 9, wherein the polyformaldehyde block comprises a plurality of stacked independent sub-blocks.

11. The clamping jaw of a connecting terminal according to claim 1, and further comprising a clamping head assembly to connect the rotary cylinder assembly to a mechanical hand, the clamping head assembly comprising:
    (a) a vertical plate fixed on the rotary cylinder component;
    (b) a guiding seat fixed on the mechanical hand and arranged in parallel with the vertical plate;
    (c) an optical shaft fixed on the vertical plate, sleeved with a spring, and slidably penetrated on the guiding seat;
    (d) a fixing block fixed on the optical shaft, the fixing block and the vertical plate being located on both sides of the guiding seat, respectively;
    (e) a light blocking plate installed between the vertical plate and the fixing block and containing a notch; and
    (f) a photoelectric switch installed on the guiding seat and triggered by the notch on the light blocking plate when the vertical plate compresses the spring in place.

* * * * *